(12) United States Patent
Filipowicz et al.

(10) Patent No.: US 11,605,190 B1
(45) Date of Patent: Mar. 14, 2023

(54) SYSTEM AND METHOD FOR DE-BIASING GRAPHICAL INFORMATION

(71) Applicant: TOYOTA RESEARCH INSTITUTE, INC., Los Altos, CA (US)

(72) Inventors: Alexandre Leo Stephen Filipowicz, Los Altos, CA (US); Scott Carter, San Jose, CA (US); Rumen Iliev, Milbrae, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/464,577

(22) Filed: Sep. 1, 2021

(51) Int. Cl.
G06T 11/20 (2006.01)
G06T 13/80 (2011.01)
G06T 11/60 (2006.01)

(52) U.S. Cl.
CPC ............ G06T 11/206 (2013.01); G06T 11/60 (2013.01); G06T 13/80 (2013.01); *G06T 2200/24* (2013.01)

(58) Field of Classification Search
CPC ....... G06T 11/206; G06T 11/60; G06T 13/80; G06T 2200/24
See application file for complete search history.

(56) References Cited

U.S. PATENT DOCUMENTS

| 9,069,847 | B2 | 6/2015 | Turner et al. |
| 9,959,642 | B2 | 5/2018 | Hori et al. |
| 10,628,706 | B2 | 4/2020 | Shrestha et al. |
| 2013/0060860 | A1* | 3/2013 | Myslinski ............... H04L 51/02 709/204 |
| 2014/0304814 | A1* | 10/2014 | Ott ........................ G06F 21/552 726/22 |
| 2021/0056428 | A1 | 2/2021 | Palowitch |
| 2022/0004898 | A1* | 1/2022 | Sinha ................... G06N 3/0454 |

FOREIGN PATENT DOCUMENTS

| CN | 108257079 A | 7/2018 |
| WO | 2020214187 A1 | 10/2020 |

OTHER PUBLICATIONS

S. Bourli and E. Pitoura, "Bias in Knowledge Graph Embeddings," 2020 IEEE/ACM International Conference on Advances in Social Networks Analysis and Mining (ASONAM), 2020, pp. 6-10, doi: 10.1109/ASONAM49781.2020.9381459. (Year: 2020).*

* cited by examiner

Primary Examiner — Michelle L Sams
(74) Attorney, Agent, or Firm — Seyfarth Shaw LLP

(57) ABSTRACT

A method for graphical information de-biasing is described. The method includes detecting biased graphical information presented to a user. The method also includes generating a neutral version of the biased graphical information to form de-biased graphical information. The method further includes displaying the de-biased graphical information to the user, including highlighted components of the de-biased graphical information.

17 Claims, 8 Drawing Sheets

SYSTEM AND METHOD FOR DE-BIASING GRAPHICAL INFORMATION

BACKGROUND

Field

Certain aspects of the present disclosure generally relate to machine learning and, more particularly, to a system and method for de-biasing graphical information.

Background

Graphical data may be presented in a manner that does not align with best practices. For example, this graphical data may include scatterplots with trend lines affected by outliers. Similarly, this graphical data may be represented using a y-axis with no origin, missing error bars, or other like graphical discrepancies. Furthermore, users may have internal biases that impact the way they interpret graphical information. Unfortunately, these biases in the presentation and interpretation of graphical data are not always obvious to a user. Furthermore, programs for creating graphical data typically cannot recognize these biases.

An interface with options to modify visual features of the graphical information to de-bias the graphical information by reducing biases introduced by both the visual elements of the graph and/or determined internal biases is desired.

SUMMARY

A method for graphical information de-biasing is described. The method includes detecting biased graphical information presented to a user. The method also includes generating a neutral version of the biased graphical information to form de-biased graphical information. The method further includes displaying the de-biased graphical information to the user, including highlighted components of the de-biased graphical information.

A non-transitory computer-readable medium having program code recorded thereon for graphical information de-biasing is described. The program code is executed by a processor. The non-transitory computer-readable medium includes program code to detect biased graphical information presented to a user. The non-transitory computer-readable medium also includes program code to generate a neutral version of the biased graphical information to form de-biased graphical information. The non-transitory computer-readable medium further includes program code to display the de-biased graphical information to the user, including highlighted components of the de-biased graphical information.

A system for graphical information de-biasing is described. The system includes a graphical data detection module to detect biased graphical information presented to a user. The method system also includes a graphical data de-biasing module to generate a neutral version of the biased graphical information to form de-biased graphical information. The method system further includes a de-biased graphical data display module to display the de-biased graphical information to the user, including highlighted components of the de-biased graphical information.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
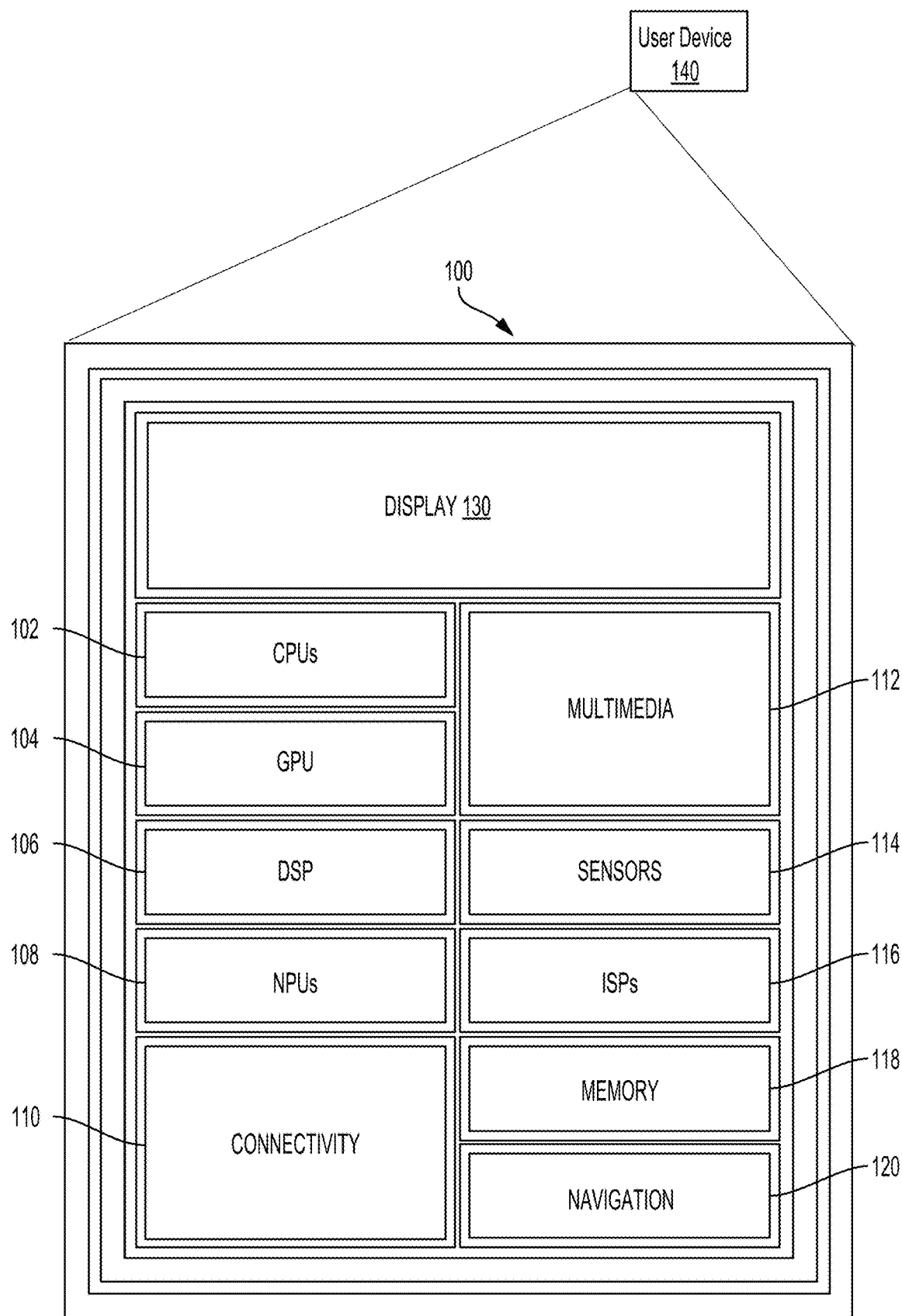
FIG. 1 illustrates an example implementation of designing a neural network using a system-on-a-chip (SOC) of a graphical information de-biasing system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Graphical data may be presented in a manner that does not align with best practices. For example, this graphical data may include scatterplots with trend lines affected by outliers. Similarly, this graphical data may be represented using a y-axis with no origin, missing error bars, or other like graphical discrepancies. Furthermore, users may have internal biases that impact the way they interpret graphical information. Unfortunately, these biases in the presentation and interpretation of graphical data are not always obvious to a user. Furthermore, programs for creating graphical data typically cannot recognize these biases. An interface with options to modify visual features of the graphical information to de-bias the graphical information by reducing biases introduced by both the visual elements of the graph and/or determined internal biases is desired.

De-biasing is the reduction of bias, particularly with respect to judgment and decision making. Biased judgment and decision making is that which systematically deviates from the prescriptions of objective standards such as facts, logic, and rational behavior or prescriptive norms. Biased judgment and decision making exists in consequential domains such as medicine, law, policy, and business, as well as in everyday life. Investors, for example, tend to hold onto falling stocks too long and sell rising stocks too quickly. Employers exhibit considerable discrimination in hiring and employment practices, and some parents continue to believe that vaccinations cause autism despite knowing that this link is based on falsified evidence. At an individual level, people who exhibit less decision bias have more intact social environments, reduced risk of alcohol and drug use, lower childhood delinquency rates, and superior planning and problem solving abilities.

Aspects of the present disclosure are directed to a system and method for detecting graphical information in a digital format and de-biasing the graphical information. Some aspects of the present disclosure provide an interface with options to modify visual features of the graphical information to de-bias the graphical information by reducing biases introduced by both the visual elements of the graph and/or determined internal biases. In some aspects of the present disclosure, the internal bias of the user may be learned or determined from user responses (e.g., using a questionnaire). These aspects of the present disclosure include a system that automatically detects graphical information, such as bar plots, scatter plots, line plots, or heat maps and de-biases the graphical information.

In some aspects of the present disclosure, the system then provides the user with options to adjust the graphs based on (1) visual features and/or (2) the user's internal biases. To adjust a graph's visual features, the system is pre-configured with a set of predetermined graphic representation rules, such as graphing best practices. Once the system has detected a graphical object, the system can adjust one or more detected graphical components to match one of graphic representation rules. For example, if the system detects a bar graph whose y-axis starts well above baseline (zero), the system can automatically reconfigure the data shown in the graph using a baseline y-axis. Some embodiments may modify the graphical data to show the user alternative representations of the data. For example, when the system detects a trend-line, the system can modify the opacity of the trend-line to match the line's correlation strength and/or adjust the trend-line based on whether the user would like to see how the trend-line is affected by the presence or omission of outliers.

FIG. 1 illustrates an example implementation of the aforementioned system and method for a graphical information de-biasing system using a system-on-a-chip (SOC) 100, according to aspects of the present disclosure. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a control action, according to the display 130 illustrating a view of a user device.

In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. The SOC 100 may be based on an Advanced Risk Machine (ARM) instruction set or the like. In another aspect of the present disclosure, the SOC 100 may be a server computer in communication with a user device 140. In this arrangement, the user device 140 may include a processor and other features of the SOC 100.

In this aspect of the present disclosure, instructions loaded into a processor (e.g., CPU 102) or the NPU 108 of the user device 140 may include code to de-bias graphical information. The instructions loaded into a processor (e.g., CPU 102) may also include code to detect biased graphical information presented to a user. The instructions loaded into a processor (e.g., CPU 102) may also include code to generate a neutral version of the biased graphical information to form de-biased graphical information. The instructions loaded into a processor (e.g., CPU 102) may also include code to display the de-biased graphical information to the user, including highlighted components of the de-biased graphical information.

Figure 2:
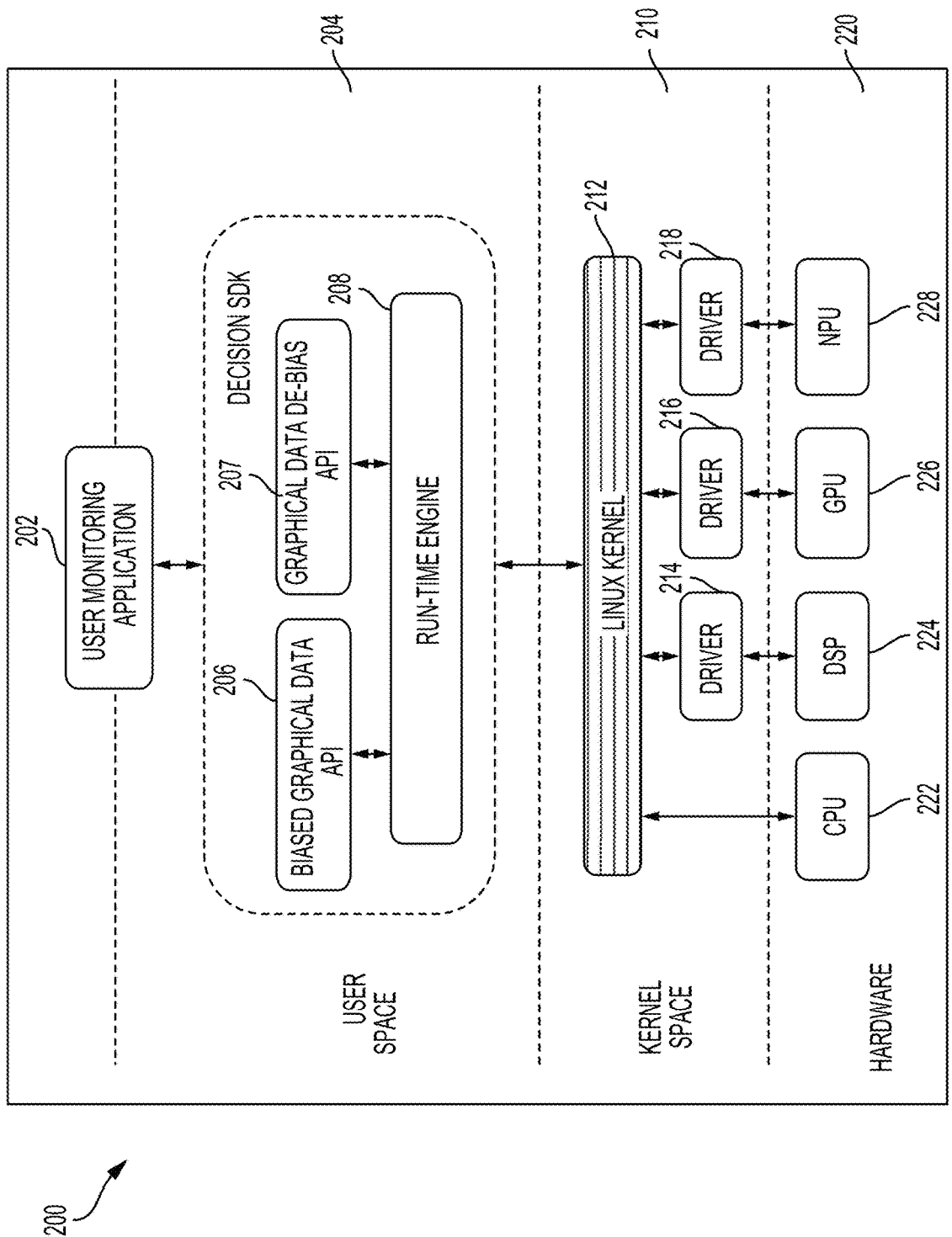
FIG. 2 is a block diagram illustrating an exemplary software architecture that may modularize artificial intelligence (AI) functions for a graphical information de-biasing system, according to aspects of the present disclosure.

FIG. 2 is a block diagram illustrating a software architecture 200 that may modularize artificial intelligence (AI) functions for a graphical information de-biasing system, according to aspects of the present disclosure. Using the architecture, a user monitoring application 202 may be designed such that it may cause various processing blocks of an SOC 220 (for example a CPU 222, a DSP 224, a GPU 226, and/or an NPU 228) to perform supporting computations during run-time operation of the user monitoring application 202. FIG. 2 describes the software architecture 200 for graphical information de-biasing, it should be recognized that the graphical information de-biasing system is not limited to graphical data. According to aspects of the present disclosure, the user monitoring and data de-biasing functionality is applicable to any type of decision or user activity.

The user monitoring application 202 may be configured to call functions defined in a user space 204 that may, for example, provide for de-biasing graphical information services. The user monitoring application 202 may make a request for compiled program code associated with a library defined in a biased graphical data application programming interface (API) 206. The biased graphical data API 206 is configured to detect biased graphical information presented to a user. In response, compiled program code of a graphical data de-bias API 207 is configured to generate a neutral version of the biased graphical information to form de-biased graphical information. In addition, the graphical data de-bias API 207 is configured to display the de-biased graphical information to the user, including highlighted components of the de-biased graphical information.

A run-time engine 208, which may be compiled code of a run-time framework, may be further accessible to the user monitoring application 202. The user monitoring application 202 may cause the run-time engine 208, for example, to take actions for providing de-biased graphical data in response to detecting biased graphical information presented to a user. In response to detection of biased graphical information, the run-time engine 208 may in turn send a signal to an operating system 210, such as a Linux Kernel 212, running on the SOC 220. FIG. 2 illustrates the Linux Kernel 212 as software architecture for biased graphical data de-biasing. It should be recognized, however, that aspects of the present disclosure are not limited to this exemplary software architecture. For example, other kernels may provide the software architecture to support the biased graphical data de-biasing functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Graphical data may be presented in a manner that does not align with best practices. For example, this graphical data may include scatterplots with trend lines affected by outliers. Similarly, this graphical data may be represented using a y-axis with no origin, missing error bars, or other like graphical discrepancies. Furthermore, users may have internal biases that impact the way they interpret graphical information. Unfortunately, these biases in the presentation and interpretation of graphical data are not always obvious to a user. Furthermore, programs for creating graphical data typically cannot recognize these biases. An interface with options to modify visual features of the graphical information to de-bias the graphical information by reducing biases introduced by both the visual elements of the graph and/or determined internal biases is desired.

De-biasing is the reduction of bias, particularly with respect to judgment and decision making. Biased judgment and decision making is that which systematically deviates from the prescriptions of objective standards such as facts, logic, and rational behavior or prescriptive norms. Biased judgment and decision making exists in consequential domains such as medicine, law, policy, and business, as well as in everyday life. Investors, for example, tend to hold onto falling stocks too long and sell rising stocks too quickly. Employers exhibit considerable discrimination in hiring and employment practices, and some parents continue to believe that vaccinations cause autism despite knowing that this link is based on falsified evidence. At an individual level, people who exhibit less decision bias have more intact social environments, reduced risk of alcohol and drug use, lower childhood delinquency rates, and superior planning and problem solving abilities.

De-biasing can occur within the decision maker. For example, a person may learn or adopt better strategies by which to make judgments and decisions. De-biasing can also occur as a result of changes in external factors, such as changing the incentives relevant to a decision or the manner in which the decision is made. There are three general approaches to de-biasing judgment and decision making, and the costly errors with which biased judgment and decision making is associated: changing incentives, nudging, and training. Each approach has strengths and weaknesses. Aspects of the present disclosure are directed to a system and method for detecting graphical information in a digital format and de-biasing the graphical information.

Figure 3:
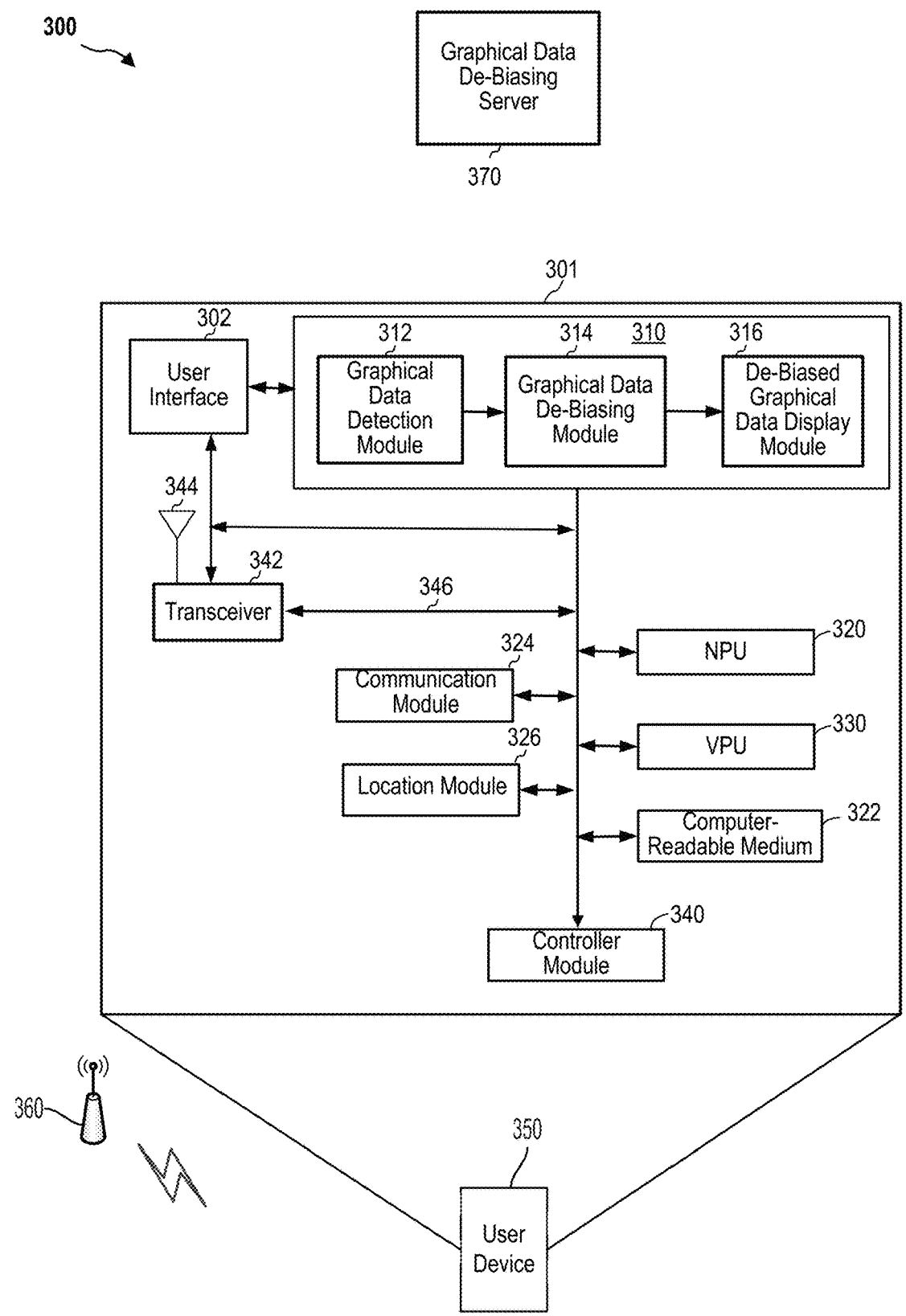
FIG. 3 is a diagram illustrating a hardware implementation for a graphical information de-biasing system, according to aspects of the present disclosure.

FIG. 3 is a diagram illustrating a hardware implementation for a graphical information de-biasing system 300, according to aspects of the present disclosure. The graphical information de-biasing system 300 may be configured to de-bias graphical information presented to a user. The graphical information de-biasing system 300 is also configured to determine a user bias to assist in the detection of biased graphical information presented to the user. In response, the graphical information de-biasing system 300 is configured to generate a neutral version of the biased graphical information to form de-biased graphical information. In addition, the graphical information de-biasing system 300 is also configured to display the de-biased graphical information to the user, including highlighted components of the de-biased graphical information.

The graphical information de-biasing system 300 includes a user monitoring system 301 and a graphical data de-biasing server 370 in this aspect of the present disclosure. The user monitoring system 301 may be a component of a user device 350. The user device 350 may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a global positioning system device, or any other suitable device that is configured to communicate via a wireless or wired medium.

The graphical data de-biasing server 370 may connect to the user device 350 for monitoring graphical information presented to the user to determine whether the graphical information is biased. For example, the graphical data de-biasing server 370 may determine a user bias to assist in the detection of biased graphical information presented to the user. In response, the graphical data de-biasing server 370 is configured to generate a neutral version of the biased graphical information to form de-biased graphical information. In addition, the graphical data de-biasing server 370 is configured to display the de-biased graphical information to the user, including highlighted components of the de-biased graphical information.

The user monitoring system 301 may be implemented with an interconnected architecture, represented generally by an interconnect 346. The interconnect 346 may include any number of point-to-point interconnects, buses, and/or bridges depending on the specific application of the user monitoring system 301 and the overall design constraints. The interconnect 346 links together various circuits including one or more processors and/or hardware modules, represented by a user interface 302, a user activity module 310, a neural network processor (NPU) 320, a computer-readable medium 322, a communication module 324, a location module 326, a vision processing unit (VPU) 330, and a controller module 340. The interconnect 346 may also link various other circuits such as timing sources, peripherals, voltage regulators, and power management circuits, which are well known in the art, and therefore, will not be described any further.

The user monitoring system 301 includes a transceiver 342 coupled to the user interface 302, the user activity module 310, the NPU 320, the computer-readable medium 322, the communication module 324, the location module 326, the VPU 330, and the controller module 340. The transceiver 342 is coupled to an antenna 344. The transceiver 342 communicates with various other devices over a transmission medium. For example, the transceiver 342 may receive commands via transmissions from a user or a connected vehicle. In this example, the transceiver 342 may receive/transmit information for the user activity module 310 to/from connected devices within the vicinity of the user device 350.

The user monitoring system 301 includes the NPU 320 coupled to the computer-readable medium 322. The NPU 320 performs processing, including the execution of software stored on the computer-readable medium 322 to provide a neural network model for user monitoring and advice recommendation functionality according to the present disclosure. The software, when executed by the NPU 320, causes the user monitoring system 301 to perform the various functions described for presenting de-biased graphical information to the user through the user device 350, or any of the modules (e.g., 310, 324, 326, 330, and/or 340). The computer-readable medium 322 may also be used for storing data that is manipulated by the VPU 330 when executing the software to analyze user communications.

The location module 326 may determine a location of the user device 350. For example, the location module 326 may use a global positioning system (GPS) to determine the location of the user device 350. The location module 326 may implement a dedicated short-range communication (DSRC)-compliant GPS unit. A DSRC-compliant GPS unit includes hardware and software to make the autonomous vehicle 350 and/or the location module 326 compliant with the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 342. For example, the communication module 324 may be configured to provide communication capabilities via different wireless protocols, such as 5G new radio (NR), Wi-Fi, long term evolution (LTE), 4G, 3G, etc. The communication module 324 may also communicate with other components of the user device 350 that are not modules of the user monitoring system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The user monitoring system 301 also includes the VPU 330 to automatically detect graphical information (e.g., bar plots, scatter plots, line plots, and/or heat maps) to enable and de-biasing of compromised graphical information. The user monitoring system 301 may follow a process to detect and determine whether graphical information presented to the user is biased. When the user monitoring system 301 has access to a document object model (DOM) (e.g., on a web page or embedded in an application), the user monitoring system 301 may compare document objects to a known set of graphical components. When no object model is available, the user monitoring system 301 may use the VPU 330 to provide computer vision techniques to find the boundaries of the graphical object and subsequently decompose the object into its components. For example, the graphical components may include individual data points, lines, bars, or color areas (e.g., in the case of heat maps).

To adjust for a user's internal biases, the user monitoring system 301 can be configured to model a user's particular biases trained with third-party software or manually configured at install time using the NPU 320. In this case, the model within the NPU 320 may predict that in a given situation a user may be more likely to under-or over-estimate trend strengths and the user monitoring system 301 can modify how the graphical data is represented to overcome the modeled biases. For example, when representing populations against which the user has shown a bias or when detecting that a user is in a more negative mood, the user monitoring system 301 may choose to increase the opacity of a trend-line, modify the color scheme of a heat map to show more contrast or change the scale of a graph in a way different from the set of predetermined graphic representation rules to reduce the user's bias with regard to the representation.

The user activity module 310 may be in communication with the user interface 302, the NPU 320, the computer-readable medium 322, the communication module 324, the location module 326, the VPU 330, the controller module 340, and the transceiver 342. In one configuration, the user activity module 310 monitors communications from the user interface 302. The user interface 302 may monitor user communications to and from the communication module 324. According to aspects of the present disclosure, the VPU 330 may use computer vision techniques to find the boundaries of the graphical object and subsequently decompose the object into its components. For example, the graphical components may include individual data points, lines, bars, or color areas (e.g., in the case of heat maps).

As shown in FIG. 3, the user activity module 310 includes the graphical data detection module 312, a graphical data de-biasing module 314, and a de-biased graphical data display module 316. The graphical data detection module 312, the graphical data de-biasing module 314, and the de-biased graphical data display module 316 may be components of a same or different artificial neural network, such as a deep convolutional neural network (CNN). The graphical data detection module 312 and the graphical data de-biasing module 314 are not limited to a CNN. The user activity module 310 monitors and analyzes graphical information received from the user interface 302.

This configuration of the user activity module 310 includes the graphical data detection module 312 configured to detect biased graphical information presented to a user. In addition, the user activity module 310 includes the graphical data de-biasing module 314 configured to generate a neutral version of the biased graphical information to form de-biased graphical information. In addition, the user activity module 310 includes the de-biased graphical data display module 316 configured to display the de-biased graphical information to the user, including highlighted components of the de-biased graphical information. In some aspects of the present disclosure, the graphical data de-biasing module 314 may be implemented and/or work in conjunction with the the graphical data de-biasing server 370.

Aspects of the present disclosure are directed to a system and method for detecting graphical information in a digital format and de-biasing the graphical information. Some aspects of the present disclosure provide an interface with options to modify visual features of the graphical information to de-bias the graphical information by reducing biases introduced by both the visual elements of the graph and/or determined internal biases. In some aspects of the present disclosure, the internal bias of the user may be learned or determined from user responses (e.g., using a questionnaire). These aspects of the present disclosure include a system that automatically detects graphical information, such as bar plots, scatter plots, line plots, or heat maps and de-biases the graphical information, for example, as shown in FIG. 4.

Figure 4:
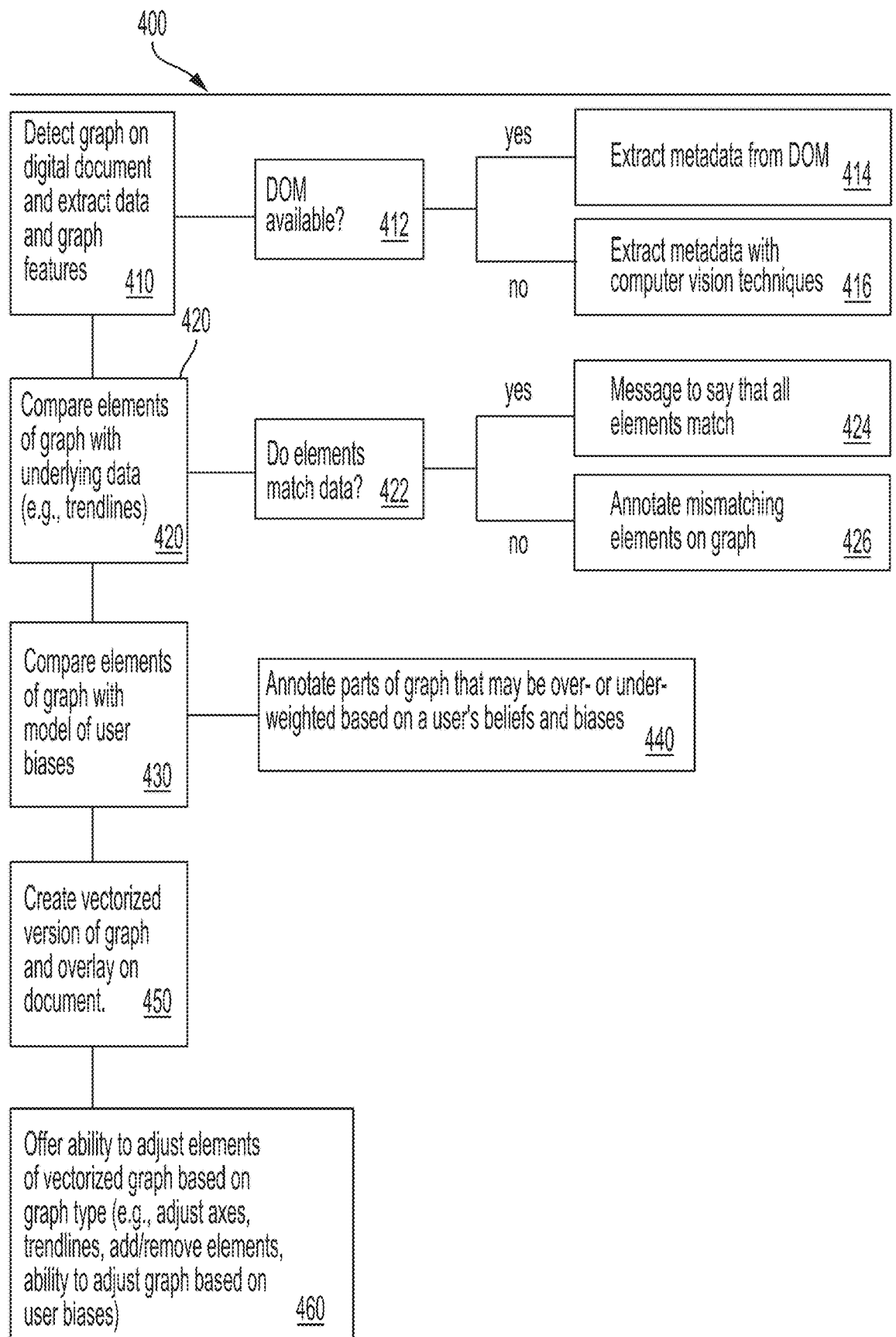
FIG. 4 is a block diagram illustrating a graphical information de-biasing system, in accordance with aspects of the present disclosure.

FIG. 4 is a block diagram illustrating a graphical information de-biasing system process, in accordance with aspects of the present disclosure. In some aspects of the present disclosure, a graphical information de-biasing process 400 automatically detects graphical information, such as bar plots, scatter plots, line plots, or heat maps and de-biases the graphical information. The graphical information de-biasing process 400 may follow a process as depicted in FIG. 4.

At block 410, a graph is detected on a digital document and data and graph features are extracted from the graph detected on the digital document. In response to the graph detected on the digital document presented to the user, at block 412 it is determined whether document object model (DOM) information (e.g., on a web page or embedded in an application) is available. When the graphical information de-biasing system has access to DOM information, at block 414, graph metadata is extracted from the DOM information. When the DOM information is unavailable, at block 416, the system may use computer vision techniques to find the boundaries of the graph detected on the digital document and subsequently decompose the graph into corresponding graph elements, such as individual data points, lines, bars, or color areas (in the case of heat maps).

Figure 5:
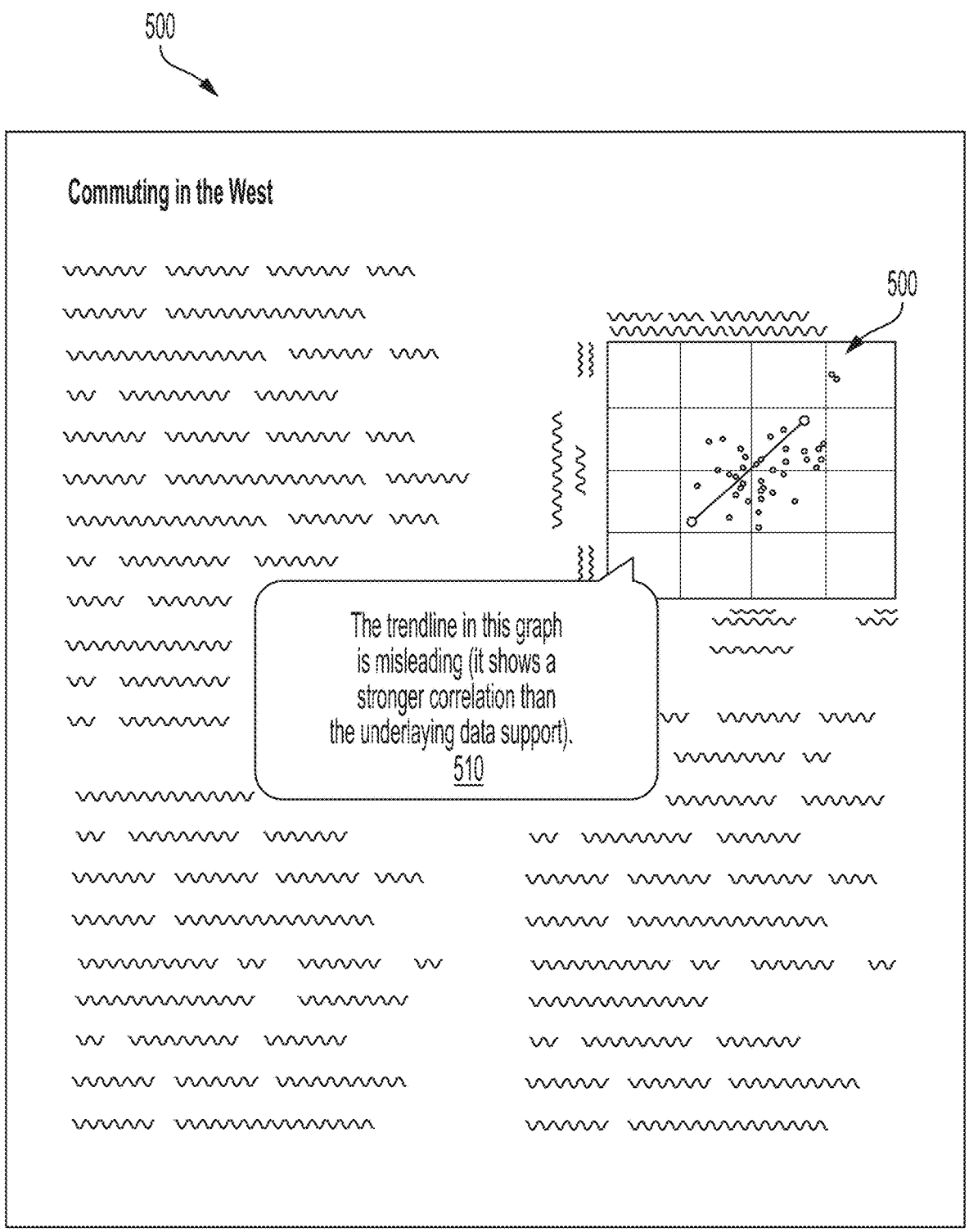
FIG. 5 is a block diagram illustrating biased graphical information, in accordance with aspects of the present disclosure.

At block 420, the system may compare graph elements with the underlying extracted data (e.g., trend-lines), graph features, and extracted metadata. At block 422, the system determines whether the graph elements match. When the graph elements match, at block 424, the system may generate a message to indicate that each of the graph elements match (e.g., the graph is unbiased). When the graph elements do not match, at block 426, the system may annotate mismatched graph elements (e.g., the graph is unbiased). For example, FIG. 5 is a block diagram illustrating biased graphical information, in accordance with aspects of the present disclosure. In this example, a trend-line 510 in a graph 500 is identified as misleading (e.g., biased) because the trend-line shows a stronger correlation than the underlying data supports.

Referring again to FIG. 4, at block 430, the system may compare graph elements with a user bias model. At block 440, in response to the comparison, elements of the graph are annotated that may be over-or under-weighted based on the user bias model. The user bias model may vary depending on the user. For example, employers exhibit considerable discrimination in hiring and employment practices, and some parents continue to believe that vaccinations cause autism despite knowing that this link is based on falsified evidence. Investors, for example, tend to hold onto falling stocks too long and sell rising stocks too quickly. At an individual level, people who exhibit less decision bias have more intact social environments, reduced risk of alcohol and drug use, lower childhood delinquency rates, and superior planning and problem solving abilities. These biases may cause the user to under-weight or over-weight certain elements of the graph, which may be highlighted at block 440.

Figure 6B:
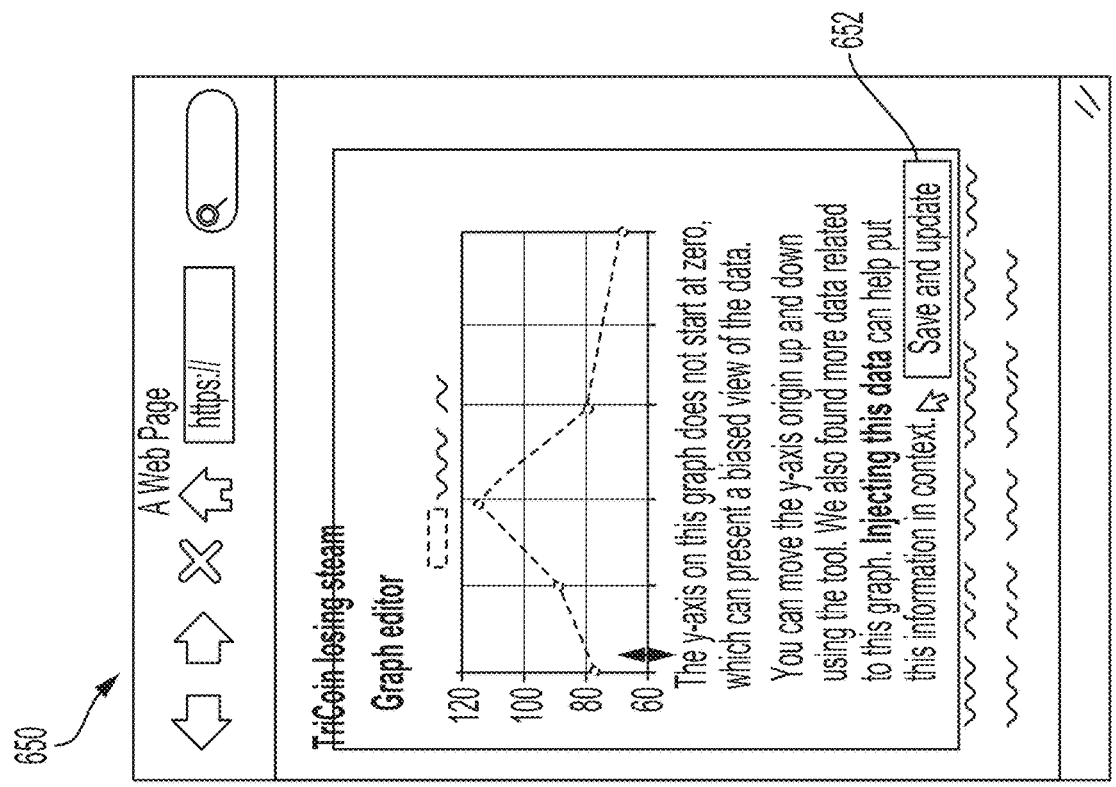
FIGS. 6A and 6B are block diagrams illustrating biased graphical information and a de-biased version of the biased graphical information including meta-information, in accordance with aspects of the present disclosure.
Figure 6A:
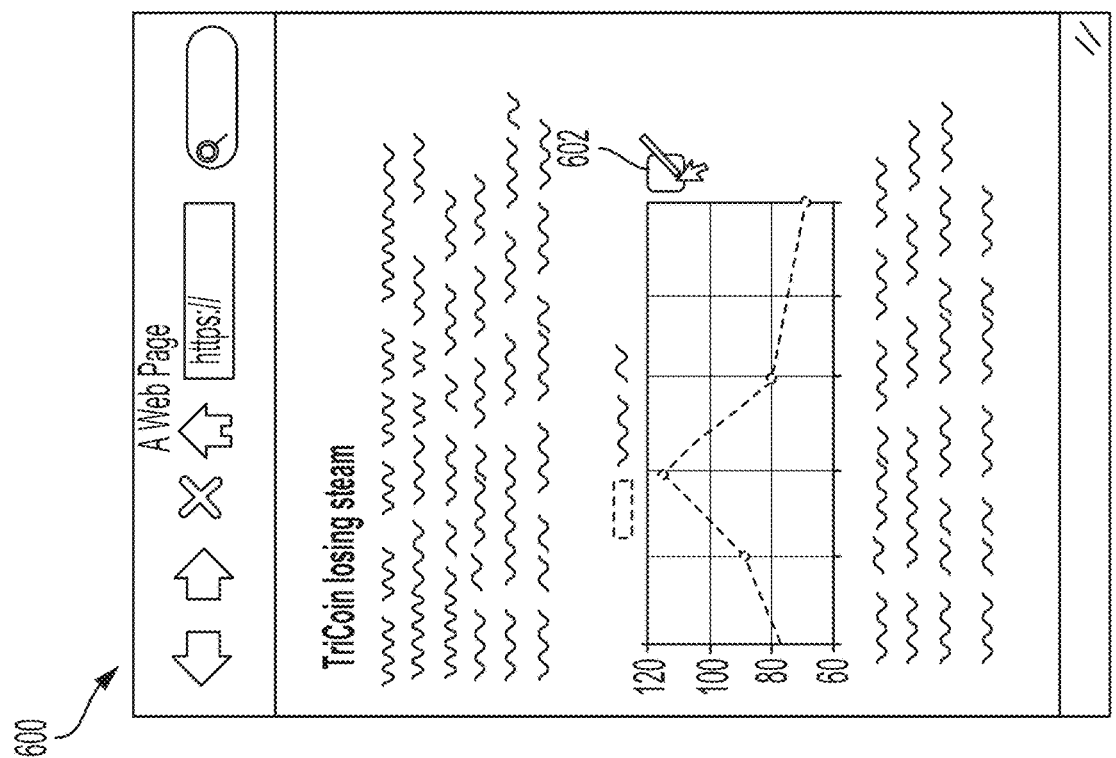

At block 450, the system creates a vectorized (e.g., neutral) version of the graph and overlays the vectorized version of the graph on the digital document. FIGS. 6A and 6B are block diagram illustrating biased graphical information and a de-biased version of the biased graphical information including meta-information, in accordance with aspects of the present disclosure.

FIG. 6A depicts a graph 600 indicating that TriCoin is losing steam. Nevertheless, the y-axis of the graph 600 does not begin at zero, which may lead to a misinterpretation, depending on a user bias. As shown in FIG. 6B, a graph editor 650 is generated as a vectorized version of the graph 600 in response to clicking of the icon 602 in FIG. 6A to indicate that the y-axis of the graph 600 does not begin at zero. As shown in FIG. 6B, the graph editor 650 is overlaid on the graph 600 shown in FIG. 6A. As shown in FIG. 6B, the user is provided the option to modify the graph editor 650 by clicking on a link 652.

Referring again to FIG. 4, at block 460, the system offers the ability to adjust elements of the vectorized graph based on the graph type (e.g., adjust axes, trend-lines, add/remove elements, and/or provide the ability to adjust the graph based on user biases). The ability to adjust elements of the vectorized graph enable de-biasing of the graph. As noted above, de-biasing is the reduction of bias, particularly with respect to judgment and decision making. Biased judgment and decision making is that which systematically deviates from the prescriptions of objective standards such as facts, logic, and rational behavior or prescriptive norms. Biased judgment and decision making exist in consequential domains such as medicine, law, policy, and business, as well as in everyday life.

In some aspects of the present disclosure, in block 460, the system links a graph view and a data model to user-controllable components. In some aspects of the present disclosure, the system then provides the user with options to adjust the graphs based on (1) visual features and/or (2) the user's internal biases. De-biasing can occur within the decision maker. For example, a person may learn or adopt better strategies by which to make judgments and decisions. De-biasing can also occur as a result of changes in external factors, such as changing the incentives relevant to a decision or the manner in which the decision is made. There are three general approaches to de-biasing judgment and decision making, and the costly errors with which biased judgment and decision making is associated: changing incentives, nudging, and training. Each approach has strengths and weaknesses.

Figure 7A:
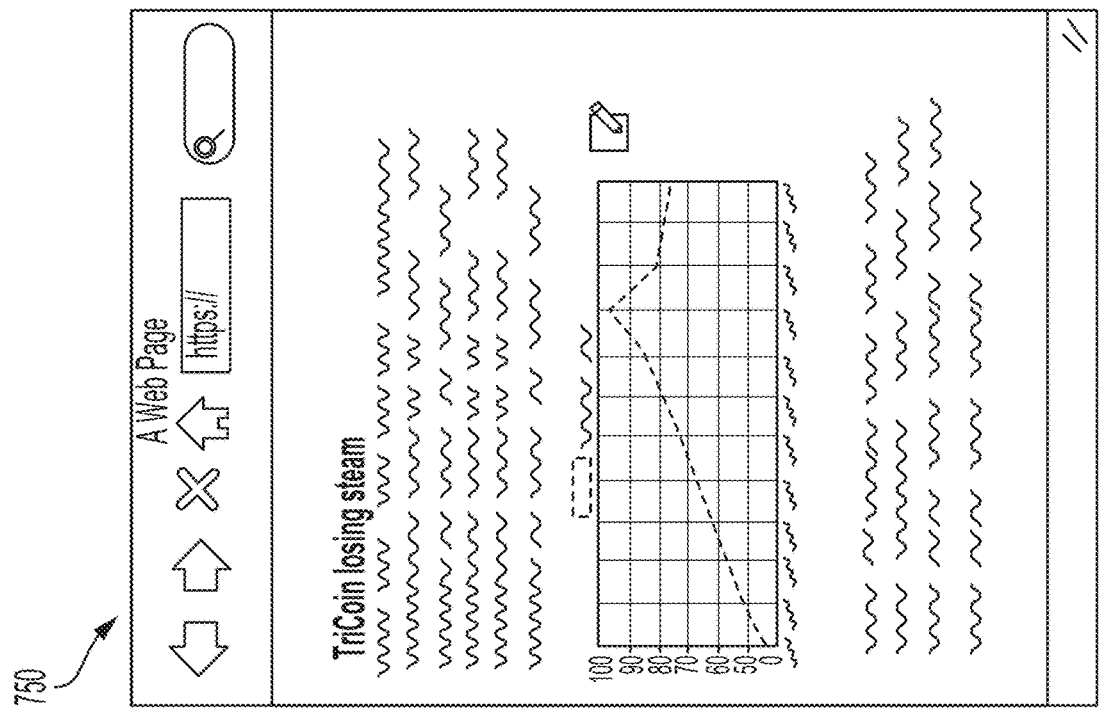
FIGS. 7A and 7B are block diagrams illustrating de-biased versions of the biased graphical information of FIGS. 6A and 6B, including meta-information, in accordance with aspects of the present disclosure.
Figure 7B:
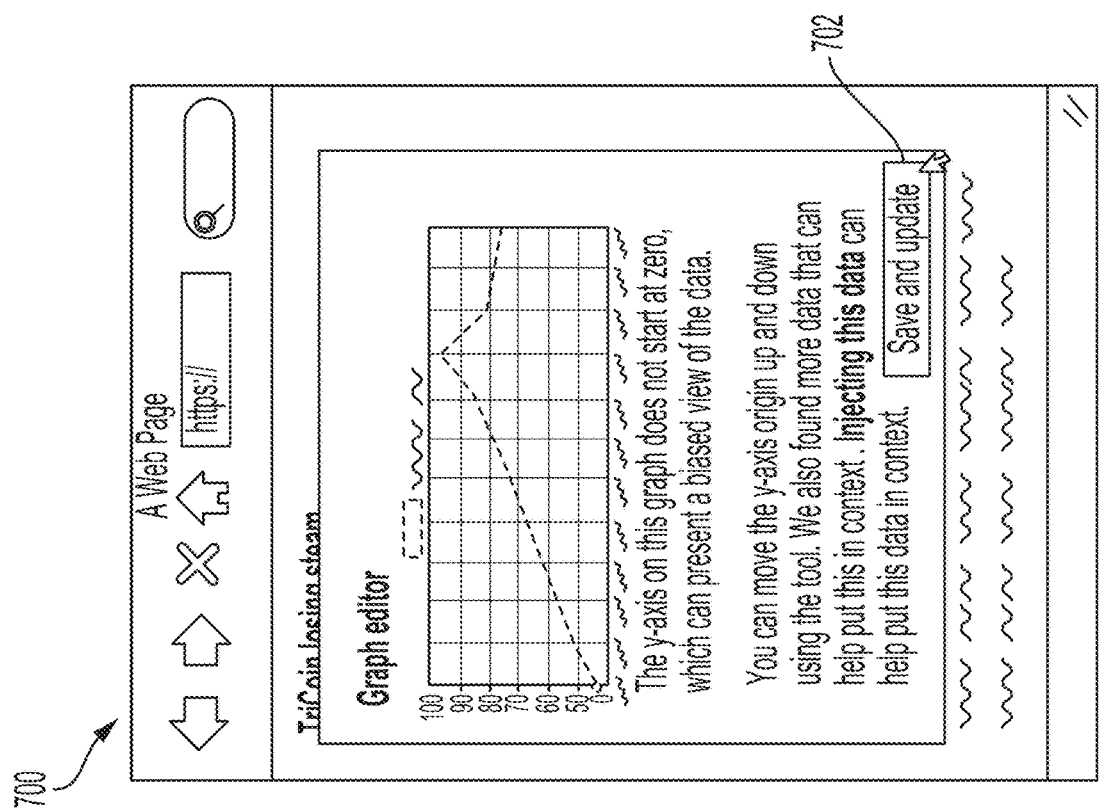

FIGS. 7A and 7B are block diagrams illustrating de-biased versions of the biased graphical information of FIGS. 6A and 6B including meta-information, in accordance with other aspects of the present disclosure. As shown in FIG. 7A, a graph editor 700 is generated in response to clicking of the link 652 in FIG. 6B to inject additional identified data to ameliorate the biased view of the data shown in FIG. 6A. For example, as shown in FIG. 7B, an updated graph 750 is shown in response to clicking on a link 702 of FIG. 7A to help place the data from the graph 600 in context, rather than the biased view of the data shown in FIG. 6A.

To adjust a graph's visual features as shown in FIGS. 6A-7B, the system is pre-configured with a set of predetermined graphic representation rules, such as graphing best practices. Once the system has detected a graphical object, the system can adjust one or more detected graphical components to match one of the graphic representation rules. For example, if the system detects a bar graph whose y-axis starts well above baseline (zero), as shown in FIG. 6A, the system can automatically reconfigure the data shown in the graph using a baseline y-axis. Some embodiments may modify the graphical data to show the user alternative representations of the data. For example, as shown in FIG. 5, when the system detects a trend-line, the system can modify the opacity of the trend-line to match the line's correlation strength. Alternatively, the system may adjust the trend-line based on whether the user would like to see how the trend-line is affected by the presence or omission of outliers.

To adjust for a user's internal biases, the system can be configured to model a user's particular biases trained with third-party software or manually configured at install time using the NPU 320 of the graphical information de-biasing system 300 in FIG. 3. In this case, a user bias model operating on the NPU 320 may predict that in a given situation a user may be more likely to under-estimate or over-estimate trend strengths, and the system can modify how the graphical data is represented to overcome the modeled biases. For example, when representing populations against which the user has shown a bias or when detecting that a user is in a more negative mood, the system may choose to increase the opacity of a trend-line. Alternatively, the system modifies the color scheme of a heat map to show more contrast or change the scale of a graph in a way different from the set of predetermined graphic representation rules to reduce the user's bias with regard to the representation.

In some aspects of the present disclosure, the system uses graphical transition effects to illustrate a manner in which the original graphical data is transformed to match a modified graph. A user could subsequently use components of the system interface to control or adjust the automated modifications implemented by the system, for example, using the graph editor shown in FIGS. 6B and 7A. One feature of the present disclosure is the ability to automatically modify graphical information to conform to a set of graphing best practices. For example, the present disclosure automatically provides a graph editor for the user to have the option of modifying graphical information that does not conform with best practice, so that biases introduced in the original graphical information are reduced. A graphical information de-biasing system may engage in a process, for example, as shown in FIG. 8.

Figure 8:
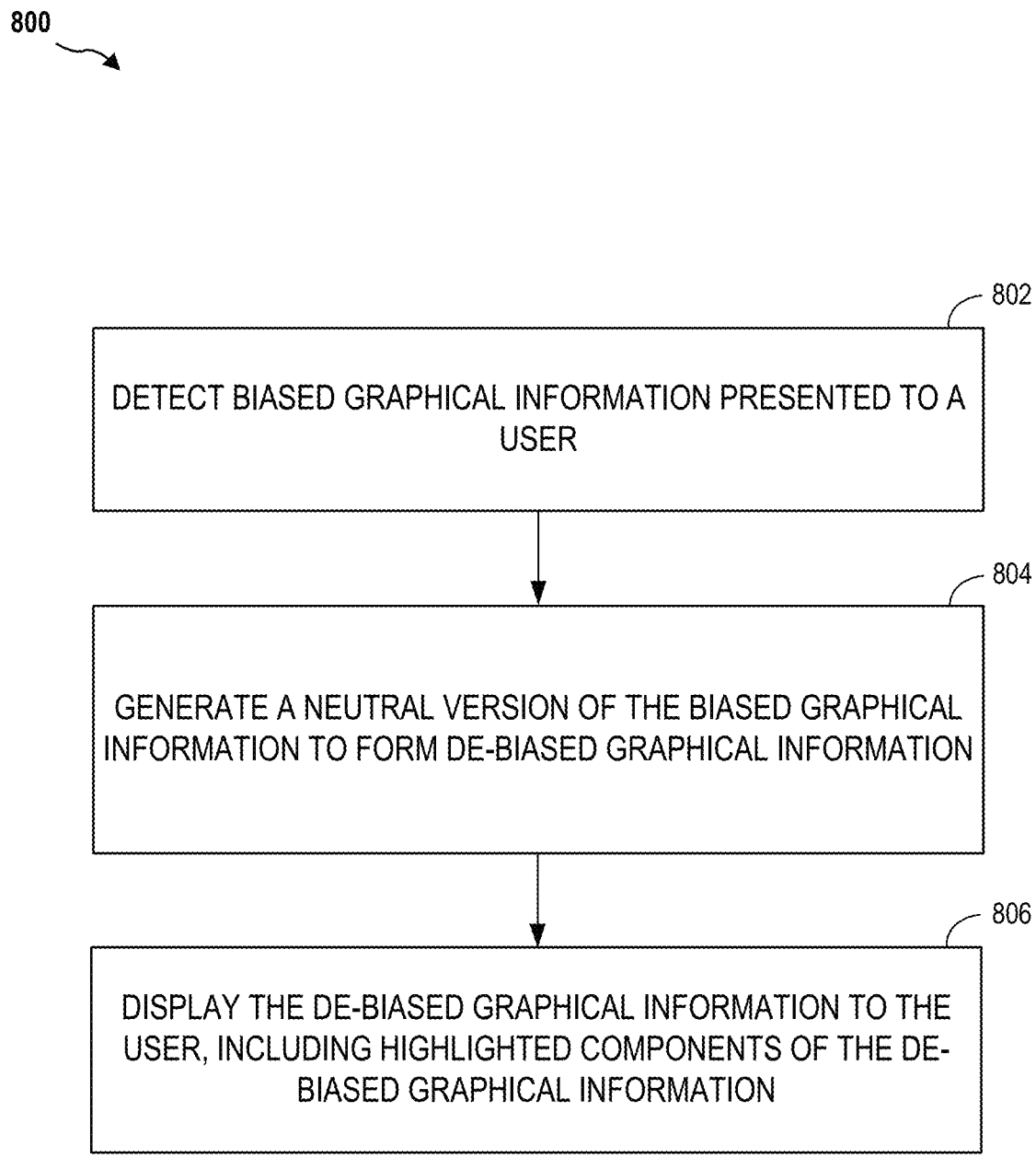
FIG. 8 is a flowchart illustrating a method for graphical information de-biasing, according to aspects of the present disclosure.

FIG. 8 is a flowchart illustrating a method for graphical information de-biasing, according to aspects of the present disclosure. A method 800 of FIG. 8 begins at block 802, in which biased graphical information presented to a user is detected. For example, as described in FIG. 4, the system may compare graph elements with the underlying extracted data (e.g., trend-lines), graph features, and extracted metadata. The system determines whether the graph elements match. When the graph elements match, the system may generate a message to indicate that each of the graph elements match (e.g., the graph is unbiased). When the graph elements do not match, at block 426, the system may annotate mismatched graph elements (e.g., the graph is biased). For example, FIG. 5 is a block diagram illustrating biased graphical information, in accordance with aspects of the present disclosure. In this example, a trend-line 510 in a graph 500 is identified as misleading (e.g., biased) because the trend-line shows a stronger correlation than the underlying data supports.

Referring again to FIG. 8, at block 804, a neutral version of the biased graphical information is generated to form de-biased graphical information. For example, FIG. 6A depicts the graph 600 indicating that TriCoin is losing steam. Nevertheless, the y-axis of the graph 600 does not begin at zero, which may lead to a misinterpretation of the graph data. As shown in FIG. 6B, the graph editor 650 is generated as a neutral version of the graph 600 in response to clicking of the icon 602 in FIG. 6A to indicate that the y-axis of the graph 600 does not begin at zero. As shown in FIG. 6B, the graph editor 650 is overlaid on the graph 600 shown in FIG. 6A. As shown in FIG. 6B, the user is provided the option to modify the graph editor 650 by clicking on a link 652.

At block 806, the de-biased graphical information is displayed to the user, including highlighted components of the de-biased graphical information. For example, as shown in FIG. 7A, the graph editor 700 is generated in response to clicking of the link 652 in FIG. 6B to inject additional identified data to ameliorate the biased view of the data shown in FIG. 6A. As shown in FIG. 7B, the updated graph 750 is shown in response to clicking on the link 702 of FIG. 7A to help place the data from the graph 600 in context, rather than the biased view of the data shown in FIG. 6A.

The method 800 may also include displaying graphical transition effects to illustrate a manner in which the biased graphical information is transformed to the de-biased graphical information. The method 800 may further include overlaying a graph editor on the biased graphical information, in which the graph editor links a graph view and a graph data model to user-controllable components of the de-biased graphical information. The method 800 may also include identifying mismatched graph elements of the biased graphical information according to a user bias model, and annotating the mismatched graphical elements. The method 800 may further include annotating mismatched graphical elements. The method 800 may also include providing user controls to alter the displaying of highlighted components of the de-biased graphical information.

Aspects of the present disclosure are directed to a system and method for detecting graphical information in a digital format and de-biasing the graphical information. Some aspects of the present disclosure provide an interface with options to modify visual features of the graphical information to de-bias the graphical information by reducing biases introduced by both the visual elements of the graph and/or determined internal biases. In some aspects of the present disclosure, the internal bias of the user may be learned or determined from user responses (e.g., using a questionnaire). These aspects of the present disclosure include a system that automatically detects graphical information, such as bar plots, scatter plots, line plots, or heat maps and de-biases the graphical information.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A computer-implemented method for graphical information de-biasing, comprising:
   detecting, by a graphical data detection module, biased graphical information presented to a user;
   generating, by a graphical data de-biasing module, a neutral version of the biased graphical information to form de-biased graphical information;
   displaying, by a de-biased graphical data display module, the de-biased graphical information to the user, including highlighted components of the de-biased graphical information; and
   providing, by a de-biased graphical data display module, user controls to alter the displaying of highlighted components of the de-biased graphical information.

2. The computer-implemented method of claim 1, in which detecting comprises:

identifying mismatched graphical elements of the biased graphical information according to a user bias model; and annotating mismatched graphical elements.

3. The computer-implemented method of claim 1, in which displaying comprises displaying graphical transition effects to illustrate a manner in which the biased graphical information is transformed to the de-biased graphical information.

4. The computer-implemented method of claim 1, in which detecting comprises:

detecting a graph on a digital document presented to the user;

detecting and extracting a graph metadata regarding the graph;

decomposing the graph into graphical elements according to the metadata;

comparing the graphical elements with the metadata regarding the graph to identify mismatched graphical elements; and annotating the mismatched graphical elements.

5. The computer-implemented method of claim 4, in which detecting and extracting the graph metadata comprises analyzing a document object model (DOM) of the biased graphical information.

6. The computer-implemented method of claim 4, in which detecting and extracting the graph metadata comprises applying computer vision to detect and extract the graph metadata of the graph.

7. The computer-implemented method of claim 1, in which displaying comprises overlaying a graph editor on the biased graphical information, in which the graph editor links a graph view and a graph data model to user-controllable components of the de-biased graphical information.

8. A non-transitory computer-readable medium having program code recorded thereon for graphical information de-biasing, the program code being executed by a processor and comprising:

program code to detect biased graphical information presented to a user;

program code to generate a neutral version of the biased graphical information to form de-biased graphical information;

program code to display the de-biased graphical information to the user, including highlighted components of the de-biased graphical information; and program code to provide user controls to alter the displaying of highlighted components of the de-biased graphical information.

9. The non-transitory computer-readable medium of claim 8, in which the program code to detect comprises:

program code to identify mismatched graphical elements of the biased graphical information according to a user bias model; and program code to annotate mismatched graphical elements.

10. The non-transitory computer-readable medium of claim 8, in which the program code to display comprises program code to display graphical transition effects to illustrate a manner in which the biased graphical information is transformed to the de-biased graphical information.

11. The non-transitory computer-readable medium of claim 8, in which the program code to detect comprises:

program code to detect a graph on a digital document presented to the user;

program code to detect and extract a graph metadata regarding the graph;

program code to decompose the graph into graphical elements according to the metadata;

program code to compare the graphical elements with the metadata regarding the graph to identify mismatched graphical elements; and program code to annotate the mismatched graphical elements.

12. The non-transitory computer-readable medium of claim 11, in which the program code to detect and extract the graph metadata comprises program code to analyze a document object model (DOM) of the biased graphical information.

13. The non-transitory computer-readable medium of claim 11, in which the program code to detect and extract the graph metadata comprises applying computer vision to detect and extract the graph metadata of the graph.

14. The non-transitory computer-readable medium of claim 8, in which the program code to display comprises program code to overlay a graph editor on the biased graphical information, in which the graph editor links a graph view and a graph data model to user-controllable components of the de-biased graphical information.

15. A system on chip (SoC) for graphical information de-biasing, the system comprising:

a graphical data detection module to detect biased graphical information presented to a user;

a graphical data de-biasing module to generate a neutral version of the biased graphical information to form de-biased graphical information; and a de-biased graphical data display module to display the de-biased graphical information to the user, including highlighted components of the de-biased graphical information, and further to provide user controls to alter the displaying of highlighted components of the de-biased graphical information.

16. The system on chip of claim 15, in which the graphical data detection module is further used to identify mismatched graph elements of the biased graphical information according to a user bias model, and to annotate mismatched graphical elements.

17. The system on chip of claim 15, in which the de-biased graphical data display module is further used to display graphical transition effects to illustrate a manner in which the biased graphical information is transformed to the de-biased graphical information.

* * * * *